US012630000B2

(12) United States Patent　(10) Patent No.:　US 12,630,000 B2
Iwamoto et al.　(45) Date of Patent:　May 19, 2026

(54) ELECTRIFIED VEHICLE

(71) Applicant: TOYOTA JIDOSHA KABUSHIKI KAISHA, Toyota (JP)

(72) Inventors: Masataka Iwamoto, Toyota (JP); Yusuke Suzuki, Nisshin (JP); Koichi Okuda, Toyota (JP); Naoki Itazu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 395 days.

(21) Appl. No.: 18/398,392

(22) Filed: Dec. 28, 2023

(65) Prior Publication Data

US 2024/0278632 A1　Aug. 22, 2024

(30) Foreign Application Priority Data

Feb. 22, 2023　(JP) ................................. 2023-026051

(51) Int. Cl.
B60K 1/02　(2006.01)
B60K 17/356　(2006.01)
(52) U.S. Cl.
CPC .............. B60K 1/02 (2013.01); B60K 17/356 (2013.01)

(58) Field of Classification Search
CPC ....................................................... B60K 1/02
See application file for complete search history.

(56) References Cited

U.S. PATENT DOCUMENTS

| | | | |
|---|---|---|---|
| 12,508,922 B2 * | 12/2025 | Iwamoto ................. | B60L 15/20 |
| 2018/0141423 A1 | 5/2018 | Makino et al. | |
| 2025/0146569 A1 * | 5/2025 | Walter ..................... | B60K 1/02 |
| 2025/0289317 A1 * | 9/2025 | Fukumura ............... | B60L 15/20 |

FOREIGN PATENT DOCUMENTS

| | | |
|---|---|---|
| JP | 2016-205488 A | 12/2016 |
| JP | 2017-133564 A | 8/2017 |

* cited by examiner

*Primary Examiner* — Kevin Hurley
(74) *Attorney, Agent, or Firm* — SoraIP, Inc.

(57)　ABSTRACT

The first drive device includes a first motor connected to the left front wheel via a first gear unit, and a second motor connected to the right front wheel via a second gear unit, and a first oil pump connected to the first gear unit or the second gear unit. The second drive device includes a third motor connected to the left rear wheel via a third gear unit, a fourth motor connected to the right rear wheel via a fourth gear unit, and a second oil pump connected to the third gear unit or the fourth gear unit. One of the first oil pump and the second oil pump is connected to the first gear unit or the third gear unit, and the other of the first oil pump and the second oil pump is connected to the second gear unit or the fourth gear unit.

5 Claims, 7 Drawing Sheets

ELECTRIFIED VEHICLE

CROSS-REFERENCE TO RELATED APPLICATION

This application claims priority to Japanese Patent Application No. 2023-026051 filed on Feb. 22, 2023, incorporated herein by reference in its entirety.

BACKGROUND

1. Technical Field

A technique disclosed in the present specification relates to an electrified vehicle.

2. Description of Related Art

Japanese Unexamined Patent Application Publication No. 2016-205488 (JP 2016-205488 A) describes a drive device for an electrified vehicle. This drive device includes two motors and is configured to drive right and left wheels independently.

SUMMARY

In the drive device described above, two gear units are provided for each of the two motors. Although the two gear units are independent of each other, oil circulation to the two gear units (and/or the two motors) can be performed by a common oil pump. In this case, the oil pump is connected to one of the two gear units, and is operated by receiving power from the one gear unit. Therefore, the loss torque caused by the oil pump is applied to only one of the two gear units, and an unintended imbalance may occur between the drive torque transmitted to the right wheel and the drive torque transmitted to the left wheel. As a result, for example, there is a risk that the straightness of the electrified vehicle may deteriorate. The present specification provides a technique that can at least partially solve such a problem.

A technique disclosed in the present specification is embodied in an electrified vehicle. This electrified vehicle includes:

a first drive device disposed at a front portion of the electrified vehicle; and a second drive device disposed at a rear portion of the electrified vehicle, in which:

the first drive device includes a first motor connected to a left front wheel of the electrified vehicle via a first gear unit, a second motor connected to a right front wheel of the electrified vehicle via a second gear unit, and a first oil pump connected to the first gear unit or the second gear unit;

the second drive device includes a third motor connected to a left rear wheel of the electrified vehicle via a third gear unit, a fourth motor connected to a right rear wheel of the electrified vehicle via a fourth gear unit, and a second oil pump connected to the third gear unit or the fourth gear unit;

one of the first oil pump and the second oil pump is connected to the first gear unit or the third gear unit; and the other of the first oil pump and the second oil pump is connected to the second gear unit or the fourth gear unit.

In the above configuration, the first drive device is disposed at the front portion of the electrified vehicle, and the second drive device is disposed at the rear portion of the electrified vehicle. In the first drive device, the first oil pump is connected to the first gear unit connected to the left front wheel, and in the second drive device, the second oil pump is connected to the fourth gear unit connected to the right rear wheel. Alternatively, in the first drive device, the first oil pump is connected to the second gear unit connected to the right front wheel, and in the second drive device, the second oil pump is connected to the third gear unit connected to the left rear wheel. According to such a configuration, the loss torque caused by the first oil pump and the loss torque caused by the second oil pump are applied to the wheels on different sides in a right-left direction (for example, the left front wheel and the right rear wheel, or the right front wheel and the left rear wheel). As a result, the imbalance of drive torque that occurs in the right and left front wheels due to the torque loss of the first oil pump is at least partially offset by the imbalance of drive torque that occurs in the right and left rear wheels due to the torque loss of the second oil pump. As a result, for example, the straightness of the electrified vehicle is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technology, the speed reduction ratio between the first oil pump and the left front wheel or the right front wheel may be equal to the speed reduction ratio between the second oil pump and the right rear wheel or the left rear wheel. According to such a configuration, the degree of drive torque imbalance occurring between the left and right front wheels and the degree of drive torque imbalance occurring between the left and right rear wheels match or approximate each other. Therefore, the straight-line performance of the electrified vehicle is further improved.

In one embodiment of the present technology, the first oil pump may be directly coupled to the first motor or the second motor. Thereby, in the first drive device, it is possible to reduce the imbalance of drive torque that occurs between the left and right front wheels. Similarly, the second oil pump may be directly connected to the fourth motor or the third motor. Thereby, also in the first drive device, it is possible to reduce the imbalance of drive torque that occurs between the left and right rear wheels.

In one embodiment of the present technology, the first oil pump may have a different size than the second oil pump. In this case, the speed reduction ratio between the first oil pump and the left front wheel or the right front wheel may be different from the speed reduction ratio between the second oil pump and the right rear wheel or the left rear wheel. If the two oil pumps have different sizes, the torque loss due to the oil pumps will also be different from each other. Accordingly, by making the reduction ratios from the oil pump to the wheels different, the unbalance of drive torque that occurs between the left and right front wheels and the unbalance of drive torque that occurs between the left and right rear wheels are made to match or approximate each other.

In one embodiment of the present technology, the first gear unit, the second gear unit, the third gear unit, and the fourth gear unit may have the same or symmetrical structure.

EXAMPLE 1

An electrified vehicle 10 according to a first embodiment will be described with reference to the drawings. The electrified vehicle 10 of this embodiment is a vehicle that is driven by a passenger, although it is not particularly limited. However, the electrified vehicle 10 may be a vehicle that runs autonomously, or may be a vehicle that is driven from a remote location by a person or a computer via wireless communication.

Figure 1:
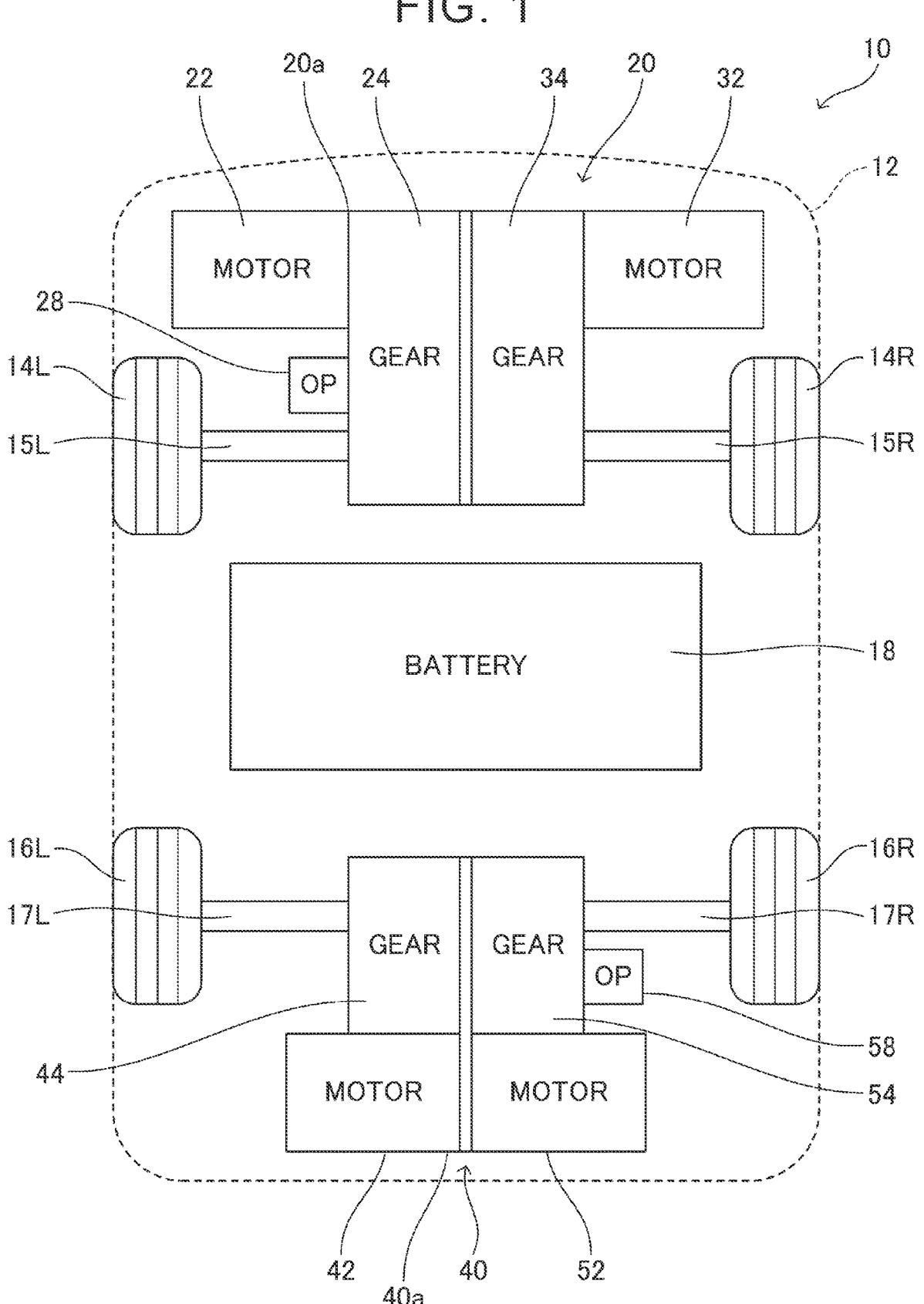
FIG. 1 schematically shows the configuration of the electrified vehicle of Example 1.

As shown in FIG. 1, the electrified vehicle 10 includes a vehicle body 12, a plurality of wheels 14L, 14R, 16L, and 16R that support the vehicle body 12, a battery pack 18, a first drive device 20, and a second drive device 40. Equipped with. The plurality of wheels 14L, 14R, 16L, and 16R include a left front wheel 14L and a right front wheel 14R located at the front of the vehicle body 12, and a left rear wheel 16L and a right rear wheel 16R located at the rear of the vehicle body 12.

The first drive device 20 is located at the front of the vehicle body 12 and is configured to drive the left front wheel 14L and the right front wheel 14R. The second drive device 40 is located at the rear of the vehicle body 12 and is configured to drive the left rear wheel 16L and the right rear wheel 16R. The battery pack 18 is a power source that supplies power to the first drive device 20 and the second drive device 40. The battery pack 18 includes a secondary battery such as a lithium ion battery, and is configured to be repeatedly chargeable and dischargeable. In addition to the battery pack 18, the electrified vehicle 10 may further include other power sources, such as a fuel cell unit.

The first drive device 20 includes a first motor 22, a first gear unit 24, a second motor 32, a second gear unit 34, and a first oil pump 28. These two motors 22, 32 and two gear units 24, 34 are housed in a common housing 20a made up of a plurality of members. Oil for lubricating and cooling the motors 22, 32 and gear units 24, 34 is stored in the housing 20a.

The first motor 22 and the first gear unit 24 are located on the left side of the housing 20a. The first motor 22 is connected to the left front wheel 14L via a first gear unit 24. The first gear unit 24 is a speed reducer having one or more gear shafts. The output torque of the first motor 22 is amplified by the first gear unit 24. The amplified torque is then transmitted to the left front wheel 14L via the drive shaft 15L as a driving torque for the left front wheel 14L. Thereby, the left front wheel 14L is driven by the first motor 22 independently of the right front wheel 14R.

The second motor 32 and the second gear unit 34 are located on the right side of the housing 20a. The second motor 32 is connected to the right front wheel 14R via a second gear unit 34. The second gear unit 34 is a speed reducer having one or more gear shafts. The output torque of the second motor 32 is amplified by the second gear unit 34. The amplified torque is then transmitted to the right front wheel 14R via the drive shaft 15R as a driving torque for the right front wheel 14R. Thereby, the right front wheel 14R is driven by the second motor 32 independently of the left front wheel 14L.

Although not particularly limited, the configurations of the first motor 22 and first gear unit 24 and the configurations of the second motor 32 and second gear unit 34 are substantially symmetrical. That is, the first motor 22 and the second motor 32 have the same structure and performance. Further, the first gear unit 24 and the second gear unit 34 have a mutually symmetrical structure, and have the same number and arrangement of built-in gear shafts. Note that the gear shaft means a rotating shaft having one or more gears.

The first oil pump 28 is a mechanical device for circulating oil within the housing 20a. The first oil pump 28 is connected to the first gear unit 24 and operates by receiving power from the first gear unit 24. When the first oil pump 28 operates, oil circulates within the housing 20a. This lubricates and cools the two motors 22, 32 and the two gear units 24, 34. Furthermore, when the first oil pump 28 operates, oil circulates between the housing 20a and an oil cooler (not shown). An oil cooler is a heat exchanger for cooling oil. Here, the first oil pump 28 can be connected to any gear shaft in the first gear unit 24.

In the first drive device 20, a single first oil pump 28 is provided for the two motors 22, 32 and the two gear units 24, 34. The single first oil pump 28 is connected to the first gear unit 24. According to such a configuration, the first gear unit 24 is loaded with loss torque due to the first oil pump 28. As a result, the drive torque transmitted to the left front wheel 14L is reduced by the loss torque. In other words, part of the power output by the first motor 22 is used to operate the first oil pump 28, and the driving torque transmitted to the left front wheel 14L is reduced by that amount. As a result, in the first drive device 20, the drive torque transmitted to the left front wheel 14L is smaller than the drive torque transmitted to the right front wheel 14R.

The second drive device 40 includes a third motor 42, a third gear unit 44, a fourth motor 52, a fourth gear unit 54, and a second oil pump 58. These two motors 42, 52 and two gear units 44, 54 are housed in a common housing 40a made up of a plurality of members. Oil for lubricating and cooling the motors 42, 52 and gear units 44, 54 is stored within the housing 40a.

The third motor 42 and the third gear unit 44 are located on the left side of the housing 40a. The third motor 42 is connected to the left rear wheel 16L via a third gear unit 44. The third gear unit 44 is a speed reducer having one or more gear shafts. The output torque of the third motor 42 is amplified by the third gear unit 44. The amplified torque is then transmitted to the left rear wheel 16L via the drive shaft 17L as a driving torque for the left rear wheel 16L. Thereby, the left rear wheel 16L is driven by the third motor 42 independently of the right rear wheel 16R.

The fourth motor 52 and the fourth gear unit 54 are located on the right side of the housing 40a. The fourth motor 52 is connected to the right rear wheel 16R via a fourth gear unit 54. The fourth gear unit 54 is a speed reducer having one or more gear shafts. The output torque of the fourth motor 52 is amplified by the fourth gear unit 54. The amplified torque is then transmitted to the right rear wheel 16R via the drive shaft 17R as a driving torque for the right rear wheel 16R. Thereby, the right rear wheel 16R is driven by the fourth motor 52 independently of the left rear wheel 16L.

Although not particularly limited, the configurations of the third motor 42 and the third gear unit 44 and the configurations of the fourth motor 52 and the fourth gear unit 54 are substantially symmetrical. That is, the third motor 42 and the fourth motor 52 have the same structure and performance. Further, the third gear unit 44 and the fourth gear unit 54 have a mutually symmetrical structure, and have the same number and arrangement of built-in gear shafts. Note that the gear shaft means a rotating shaft having one or more gears.

On the other hand, the configurations of the third motor 42 and the third gear unit 44 are different from the configurations of the first motor 22 and the first gear unit 24 of the first drive device 20, and the configurations of the fourth motor 52 and the fourth gear The configuration of the unit 54 is different from the configuration of the second motor 32 and second gear unit 34 of the first drive device 20. However, as another embodiment, the configuration of the third motor 42 and the third gear unit 44 may be the same as the configuration of the first motor 22 and the first gear unit 24 of the first drive device 20, and the configuration of the fourth motor 52 and the fourth gear unit 54 may have the same configuration as the second motor 32 and the second gear unit 34 of the first drive device 20.

The second oil pump 58 is a mechanical device for circulating oil within the housing 40a. The second oil pump 58 is connected to the fourth gear unit 54 and operates by receiving power from the fourth gear unit 54. When the second oil pump 58 operates, oil circulates within the housing 40a. This lubricates and cools the two motors 42, 52 and the two gear units 44, 54. Furthermore, when the second oil pump 58 operates, oil circulates between the housing 40a and an oil cooler (not shown). Here, the second oil pump 58 can be connected to any gear shaft in the fourth gear unit 54.

In the second drive device 40 as well, a single second oil pump 58 is provided for the two motors 42, 52 and the two gear units 44, 54. The single second oil pump 58 is connected to the fourth gear unit 54. According to such a configuration, the fourth gear unit 54 is loaded with loss torque due to the second oil pump 58. As a result, the drive torque transmitted to the right rear wheel 16R is reduced by the loss torque. In other words, part of the power output by the fourth motor 52 is used to operate the second oil pump 58, and the driving torque transmitted to the right rear wheel 16R is reduced by that amount. As a result, in the second drive device 40, the drive torque transmitted to the right rear wheel 16R is smaller than the drive torque transmitted to the left rear wheel 16L.

As described above, in the first drive device 20, the drive torque transmitted to the left front wheel 14L is smaller than the drive torque transmitted to the right front wheel 14R due to the torque loss caused by the first oil pump 28. Therefore, the unbalance of the driving torque between the front wheels 14L and 14R acts to cause the electrified vehicle 10 to turn to the left. On the other hand, in the second drive device 40, due to torque loss caused by the second oil pump 58, the drive torque transmitted to the right rear wheel 16R becomes smaller than the drive torque transmitted to the left rear wheel 16L. Therefore, the unbalance of the driving torque between the rear wheels 16L and 16R acts to cause the electrified vehicle 10 to turn to the right. As a result, the unbalance of drive torque at the front wheels 14L, 14R is at least partially offset by the unbalance of drive torque at the rear wheels 16L, 16R. As a result, for example, the straightness of the electrified vehicle 10 is improved.

In the electrified vehicle 10 of this embodiment, the first oil pump 28 is connected to the first gear unit 24, and the second oil pump 58 is connected to the fourth gear unit 54. On the other hand, in other embodiments, the first oil pump 28 may be connected to the second gear unit 34 and the second oil pump 58 may be connected to the third gear unit 44. With such a configuration, the loss torque caused by the first oil pump 28 and the loss torque caused by the second oil pump 58 are different from each other in the left and right direction (i.e., the right front wheel 14R and the left rear wheel 16L). Therefore, the unbalance of drive torque at the front wheels 14L, 14R is at least partially offset by the unbalance of drive torque at the rear wheels 16L, 16R. Regarding this point, the same applies to other embodiments described below.

EXAMPLE 2

Figure 2:
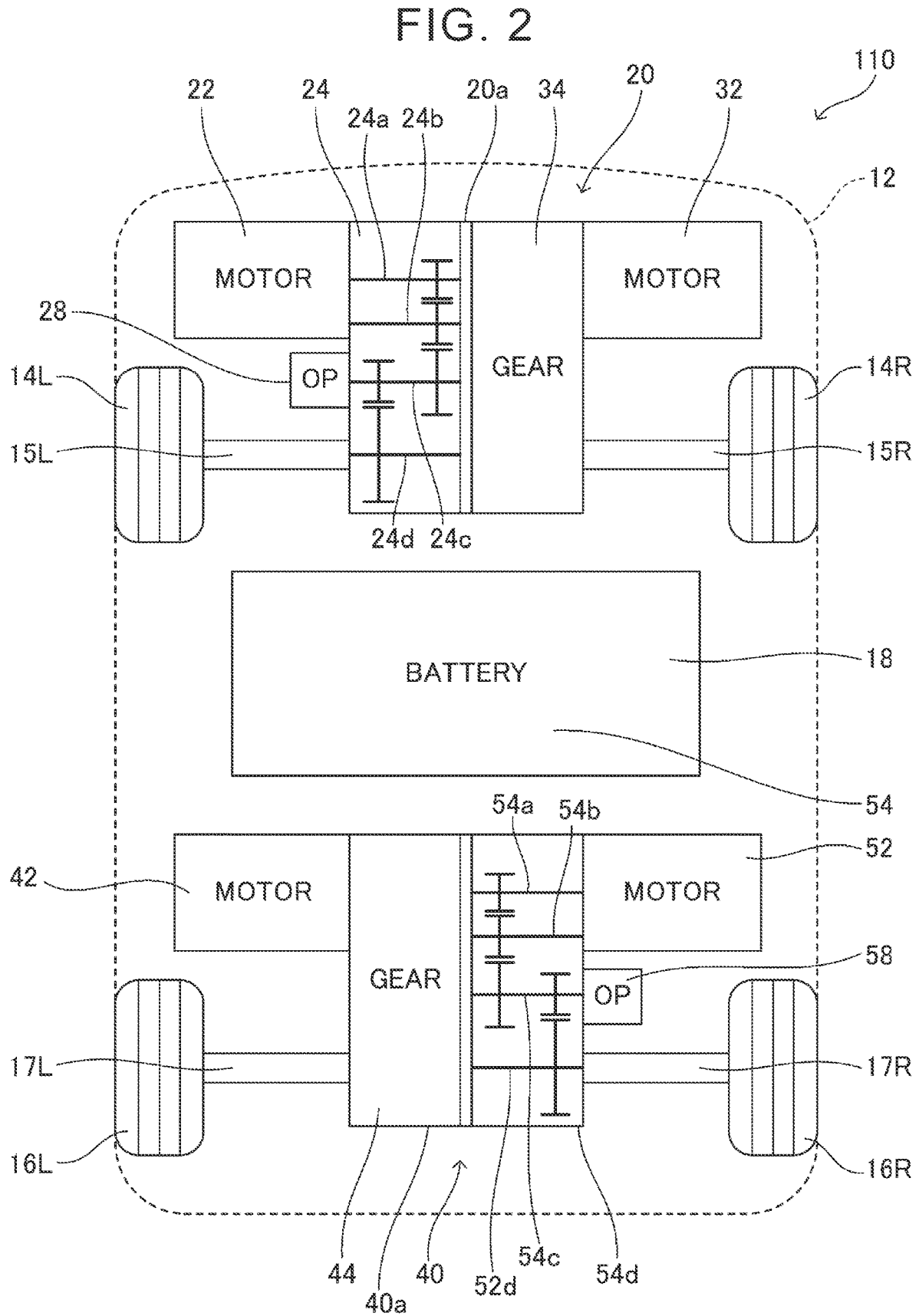
FIG. 2 schematically shows the configuration of the electrified vehicle of Example 2.

Referring to FIG. 2, an electrified vehicle 110 according to a second embodiment will be described. In the description of this embodiment, the same reference numerals are given to components common or corresponding to those of the electrified vehicle 10 of the first embodiment, and redundant explanation will be omitted. That is, the above description of the first embodiment also applies to the electrified vehicle 110 of the second embodiment, unless inconsistent with the following description.

As shown in FIG. 2, in the electrified vehicle 110 of this embodiment, the first drive device 20 and the second drive device 40 have the same structure. Furthermore, all the gear units 24, 34, 44, and 54 are four-shaft type speed reducers. For example, the first gear unit 24 has four gear shafts: a motor shaft 24a, a first counter shaft 24b, a second counter shaft 24c, and an output shaft 24d. The motor shaft 24a is connected to the first motor 22. The first counter shaft 24b is engaged with the motor shaft 24a, and the second counter shaft 24c is engaged with the first counter shaft 24b. The output shaft 24d is engaged with the second counter shaft 24c and is connected to the left front wheel 14L via the drive shaft 15L. Similarly, the fourth gear unit 54 has four gear shafts: a motor shaft 54a, a first counter shaft 54b, a second counter shaft 54c, and an output shaft 54d. The same applies to the other gear units 34 and 44.

In the first drive device 20, a first oil pump 28 is connected to a second counter shaft 24c of the first gear unit 24. Similarly, in the second drive device 40, the second oil pump 58 is connected to the second counter shaft 54c of the fourth gear unit 54. That is, the first oil pump 28 and the second oil pump 58 are connected to mutually corresponding gear shafts in the respective gear units 24, 54. According to such a configuration, the speed reduction ratio between the first oil pump 28 and the left front wheel 14L is equal to the speed reduction ratio between the second oil pump 58 and the right rear wheel 16R. As a result, the degree of drive torque imbalance in the front wheels 14L, 14R and the degree of drive torque imbalance in the rear wheels 16L, 16R match or approximate each other. Therefore, the straightness of the electrified vehicle 10 is further improved.

EXAMPLE 3

Figure 3:
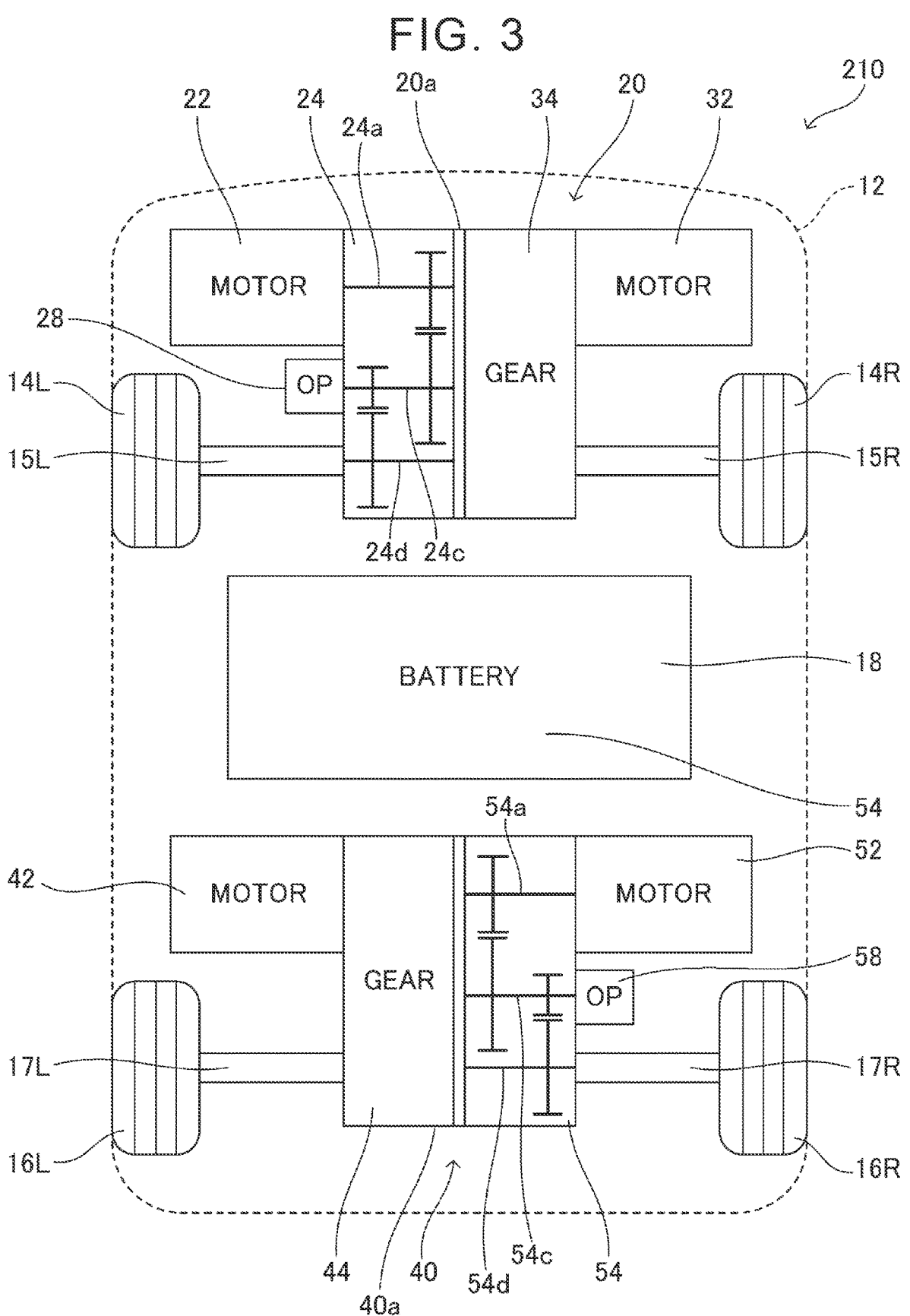
FIG. 3 schematically shows the configuration of the electrified vehicle of Example 3.

Referring to FIG. 3, an electrified vehicle 210 according to a third embodiment will be described. Also in the description of this embodiment, the same reference numerals are given to the same components as those of the electrified vehicles 10 and 110 of the first and second embodiments, and the same reference numerals are used to omit redundant explanation. That is, the above description of Examples 1 and 2 also applies to the electrified vehicle 210 of Example 3, unless inconsistent with the following description.

As shown in FIG. 3, in the electrified vehicle 210 of this embodiment, the first drive device 20 and the second drive device 40 have the same structure. Furthermore, all the gear units 24, 34, 44, and 54 are three-shaft type speed reducers. For example, the first gear unit 24 has three gear shafts: a motor shaft 24*a*, a second counter shaft 24*c*, and an output shaft 24*d*. That is, compared to the electrified vehicle 110 of the second embodiment, the first counter shaft 24*b* is omitted, and the motor shaft 24*a* and the second counter shaft 24*c* are engaged with each other. Similarly, the fourth gear unit 54 has three gear shafts: a motor shaft 54*a*, a first counter shaft 54*b*, and an output shaft 54*d*. The same applies to the other gear units 34 and 44.

The first oil pump 28 and the second oil pump 58 are connected to corresponding second counter shafts 24*c* in the respective gear units 24, 54. This point is similar to the electrified vehicle 110 of the second embodiment, and the speed reduction ratio between the first oil pump 28 and the left front wheel 14L is the same as the speed reduction ratio between the second oil pump 58 and the right rear wheel 16R. Equal to the intervening reduction ratio. As a result, the degree of drive torque imbalance in the front wheels 14L, 14R and the degree of drive torque imbalance in the rear wheels 16L, 16R match or approximate each other. Therefore, the straightness of the electrified vehicle 10 is further improved.

EXAMPLE 4

Figure 4:
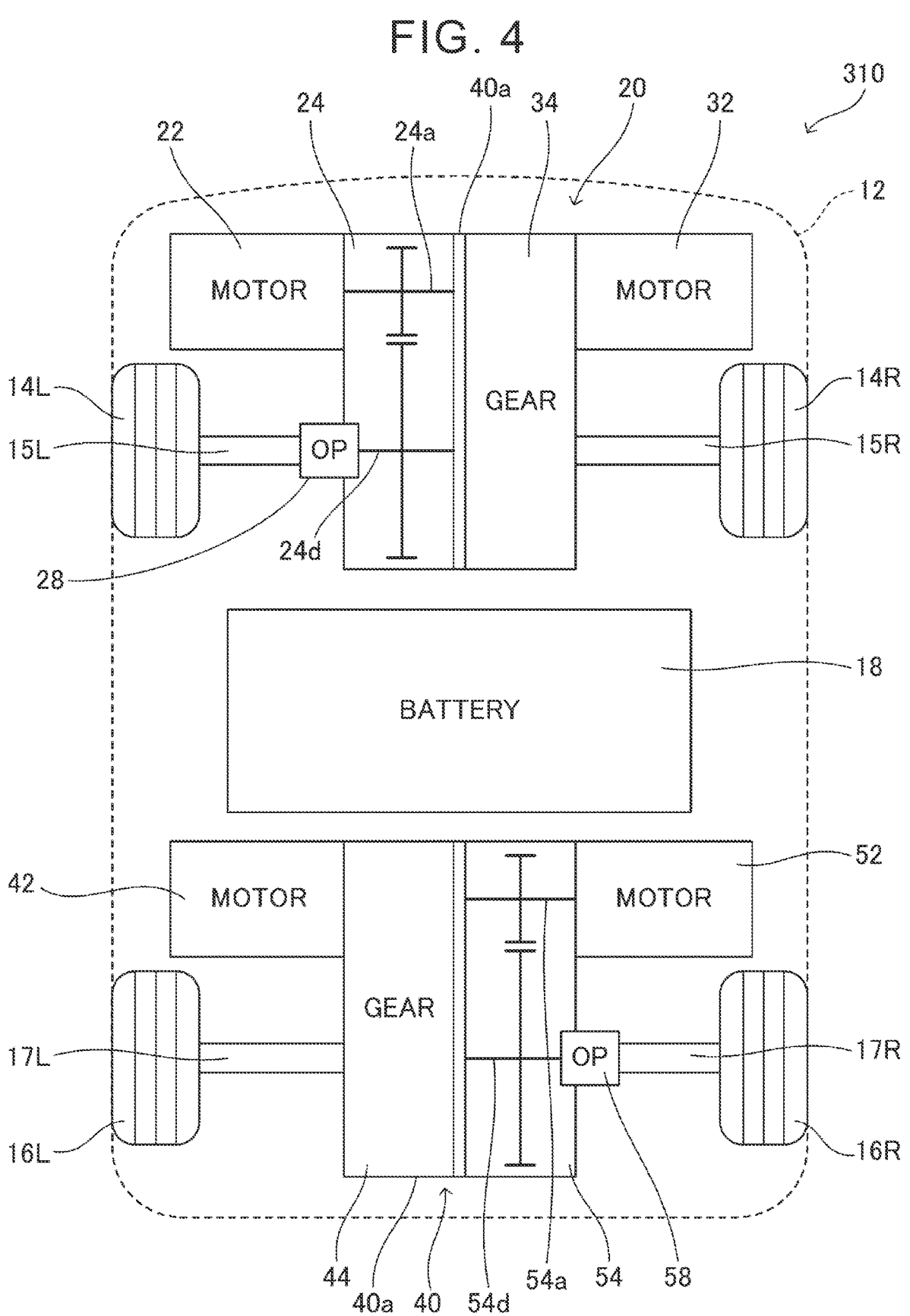
FIG. 4 schematically shows the configuration of the electrified vehicle of Example 4.

Referring to FIG. 4, an electrified vehicle 310 according to a fourth embodiment will be described. Also in the description of this embodiment, the same reference numerals are given to the same components as those of the electrified vehicles 10, 110, and 210 of the first, second, and third embodiments, and the same reference numerals are used to omit redundant explanation. That is, the above description of Examples 1, 2, and 3 also applies to the electrified vehicle 310 of Example 4, unless inconsistent with the following description.

As shown in FIG. 4, in the electrified vehicle 310 of this embodiment, the first drive device 20 and the second drive device 40 have the same structure. Moreover, all the gear units 24, 34, 44, and 54 are two-shaft type speed reducers. For example, the first gear unit 24 has a motor shaft 24*a* and an output shaft 24*d* as two gear shafts. That is, compared to the electrified vehicle 210 of the third embodiment, the second counter shaft 24*c* is further omitted, and the motor shaft 24*a* and the output shaft 24*d* are engaged with each other. Similarly, the fourth gear unit 54 has a motor shaft 54*a* and an output shaft 54*d* as two gear shafts. The same applies to the other gear units 34 and 44.

The first oil pump 28 and the second oil pump 58 are connected to corresponding output shafts 24*d* in the respective gear units 24, 54. Even in this case, the speed reduction ratio (=1) interposed between the first oil pump 28 and the left front wheel 14L is the same as the speed reduction ratio (=1) interposed between the second oil pump 58 and the right rear wheel 16R. As a result, the degree of drive torque imbalance in the front wheels 14L, 14R and the degree of drive torque imbalance in the rear wheels 16L, 16R match or approximate each other. Therefore, the straightness of the electrified vehicle 10 is further improved.

EXAMPLE 5

Figure 5:
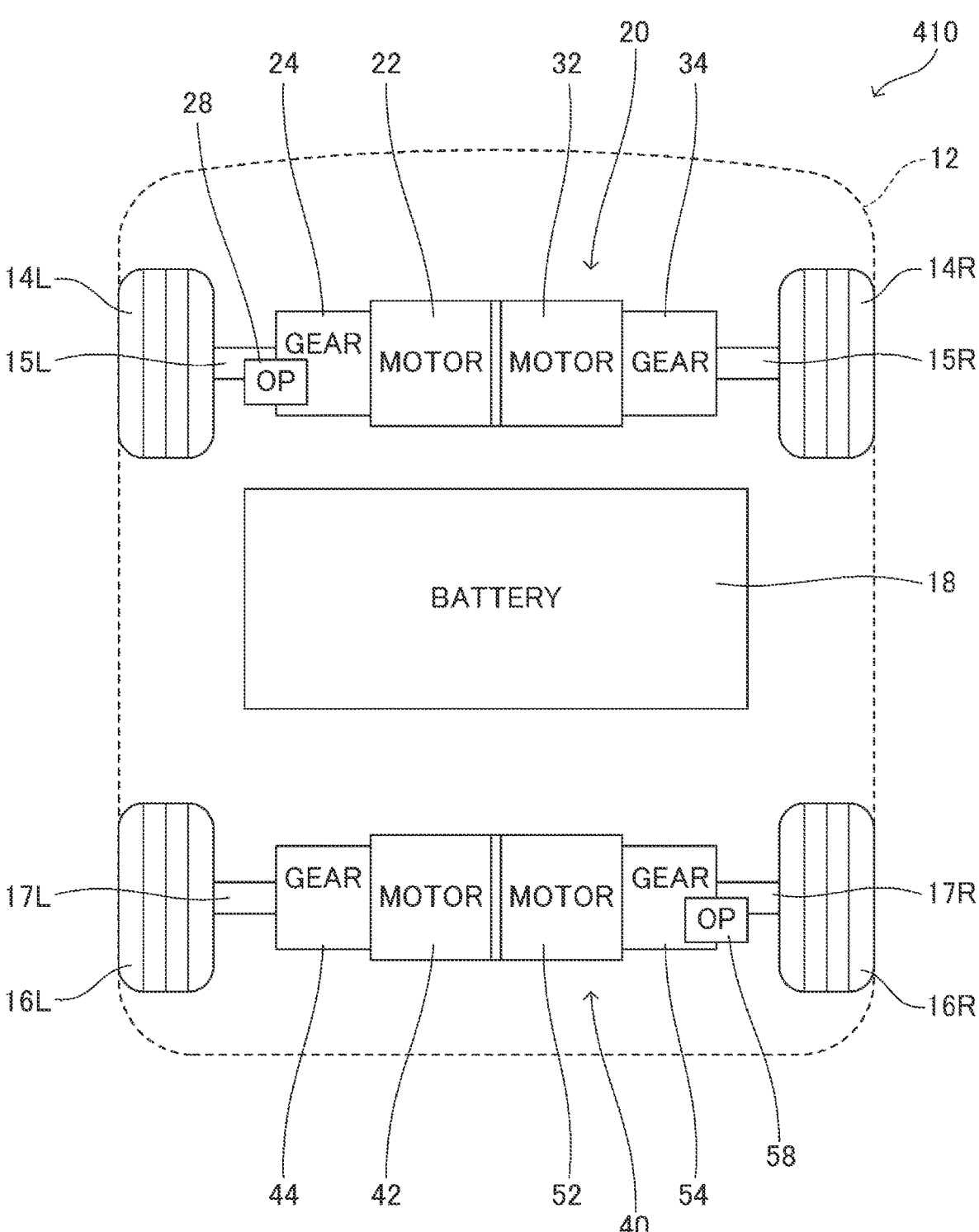
FIG. 5 schematically shows the configuration of the electrified vehicle of Example 5.

Referring to FIG. 5, an electrified vehicle 410 according to a fifth embodiment will be described. In the description of this embodiment, the same reference numerals are given to the same components as those of the electrified vehicles 10, 110, 210, and 310 of the embodiments 1-4, and redundant explanation will be omitted. That is, the above description regarding Examples 1-4 also applies to the electrified vehicle 410 of Example 5, unless inconsistent with the following description.

As shown in FIG. 5, in the electrified vehicle 410 of this embodiment, the first drive device 20 and the second drive device 40 have the same structure. Furthermore, all the gear units 24, 34, 44, and 54 are single-shaft type speed reducers. The first oil pump 28 and the second oil pump 58 are connected to a single gear shaft of each gear unit 24, 54.

EXAMPLE 6

Figure 6:
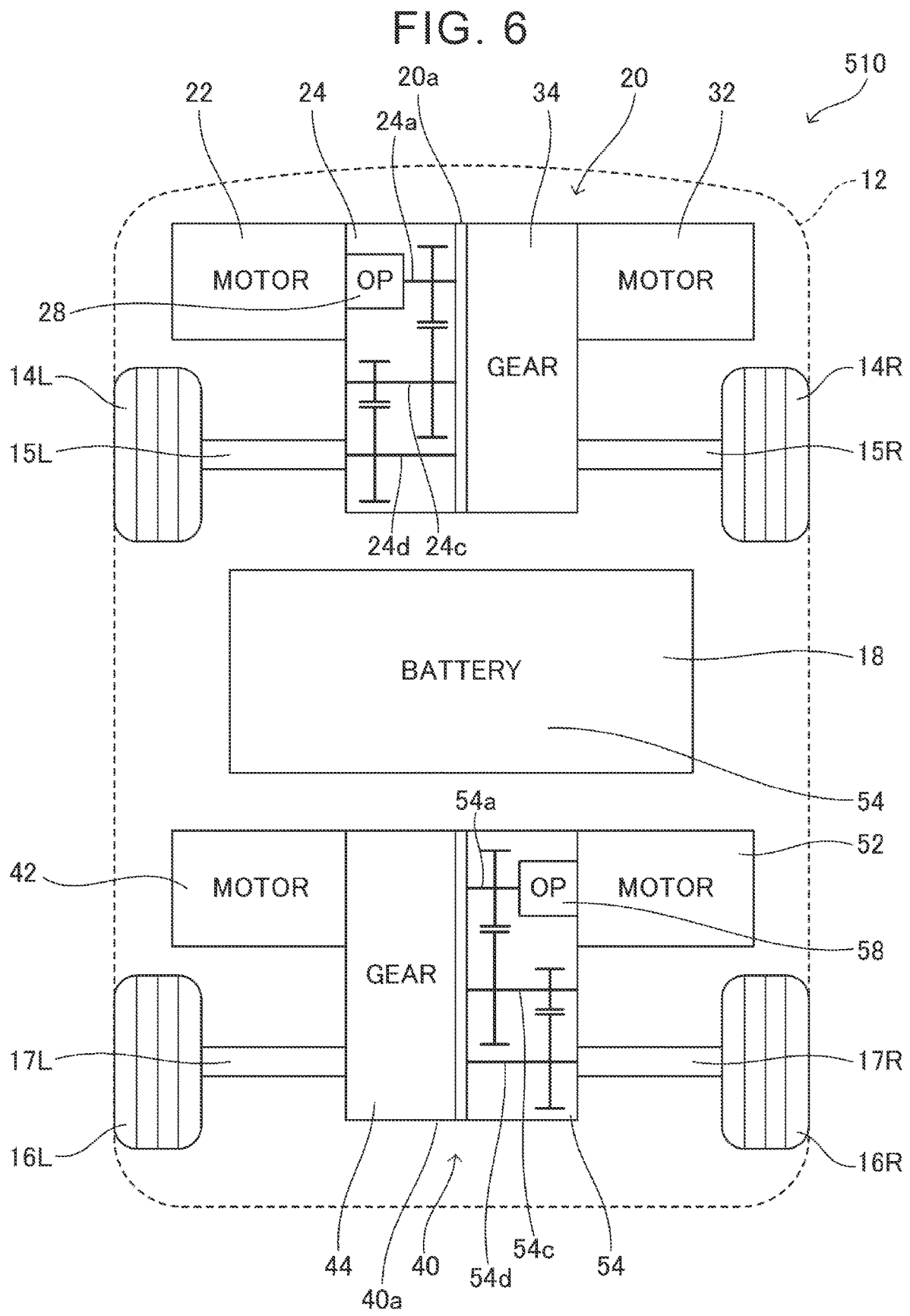
FIG. 6 schematically shows the configuration of the electrified vehicle of Example 6.

Referring to FIG. 6, an electrified vehicle 510 according to a sixth embodiment will be described. In the description of this embodiment, the same reference numerals are given to the same components as those of the electrified vehicles 10, 110, 210, 310, and 410 of the embodiments 1-5, and redundant explanation will be omitted. That is, the above description regarding Examples 1-5 also applies to the electrified vehicle 510 of Example 6, unless inconsistent with the following description.

As shown in FIG. 6, in the electrified vehicle 510 of this embodiment, the positions of the first oil pump 28 and the second oil pump 58 are changed compared to the electrified vehicle 210 of the third embodiment. The first oil pump 28 is connected to the motor shaft 24*a* in the first gear unit 24. That is, the first oil pump 28 is directly connected to the first motor 22. Similarly, the second oil pump 58 is connected to the motor shaft 54*a* in the fourth gear unit 54. That is, the second oil pump 58 is directly connected to the fourth motor 52.

Also in the electrified vehicle 10 of this embodiment, the first oil pump 28 and the second oil pump 58 are connected to mutually corresponding gear shafts (i.e., motor shafts 24*a*, 54*a*) in the respective gear units 24, 54. As a result, the speed reduction ratio between the first oil pump 28 and the left front wheel 14L is equal to the speed reduction ratio between the second oil pump 58 and the right rear wheel 16R. As a result, the degree of drive torque imbalance in the front wheels 14L, 14R and the degree of drive torque imbalance in the rear wheels 16L, 16R match or approximate each other. Therefore, the straightness of the electrified vehicle 10 is further improved. In addition, also in the other embodiments described above, the first oil pump 28 and the second oil pump 58 may be connected to the motor shafts 24*a*, 54*a* in the respective gear units 24, 54.

EXAMPLE 7

Figure 7:
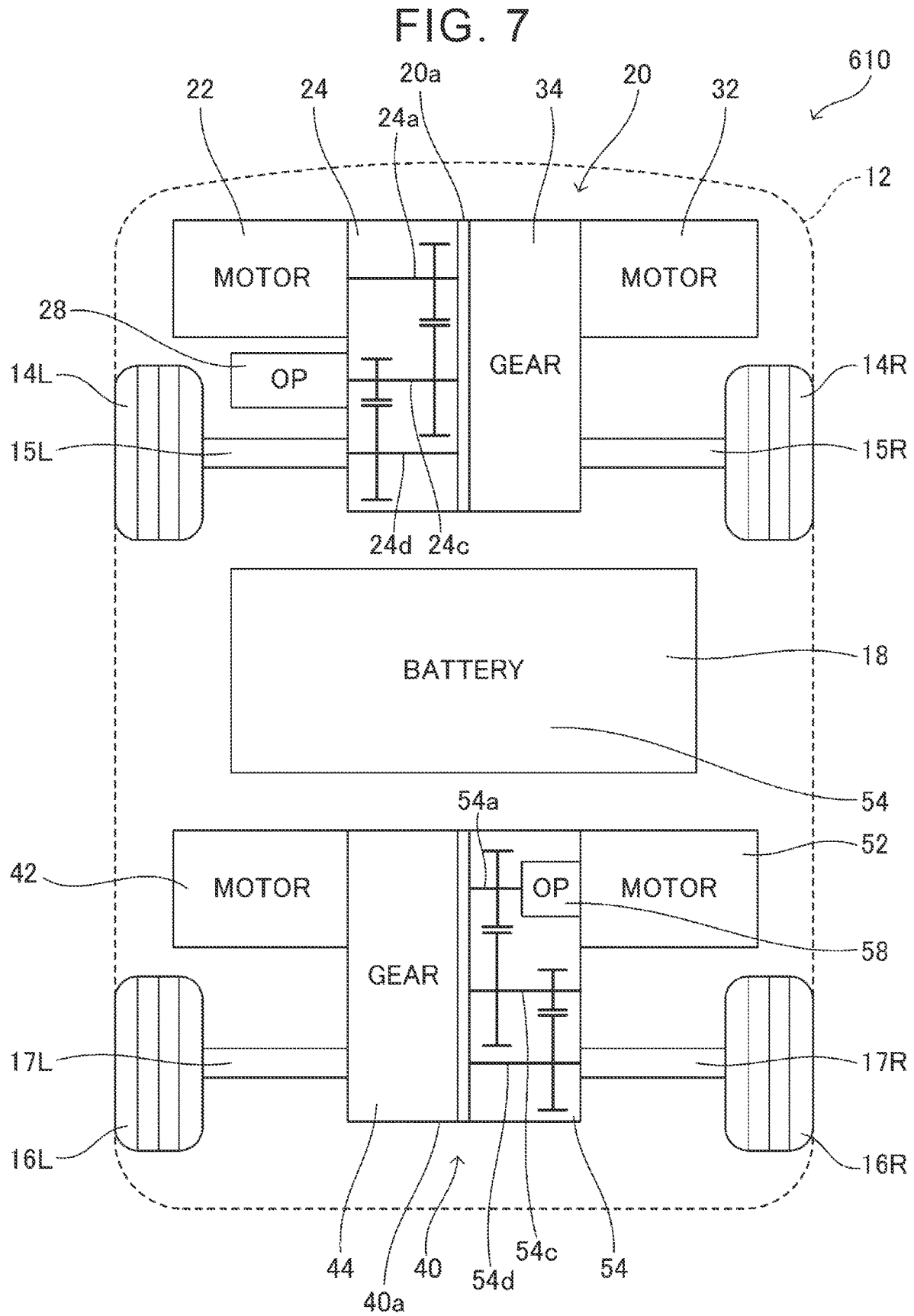
FIG. 7 schematically shows the configuration of the electrified vehicle of Example 7.

Referring to FIG. 7, an electrified vehicle 610 according to a seventh embodiment will be described. In the description of this embodiment, the same reference numerals are given to the same components as those of the electrified vehicles 10, 110, 210, 310, and 410 of the embodiments 1-6, and redundant explanation will be omitted. That is, the above description regarding Examples 1-5 also applies to the electrified vehicle 610 of Example 7, unless inconsistent with the following description.

As shown in FIG. 6, in the electrified vehicle 610 of this embodiment, the configuration and position of the first oil pump 28 and the second oil pump 58 are changed compared to the electrified vehicle 210 of the third embodiment. First, the first oil pump 28 and the second oil pump 58 have different sizes and different performances. Specifically, the size of the first oil pump 28 is larger than the size of the second oil pump 58. Therefore, the torque loss caused by the first oil pump 28 is larger than the torque loss caused by the second oil pump 58.

Second, in the first drive device 20, the first oil pump 28 is connected to the second counter shaft 24*c* of the first gear unit 24. On the other hand, in the second drive device 40, the second oil pump 58 is connected to the second counter shaft 54*c* of the fourth gear unit 54. As a result, the speed reduction ratio between the first oil pump 28 and the left front wheel 14L is different from the speed reduction ratio between the second oil pump 58 and the right rear wheel 16R. Specifically, the speed reduction ratio between the first oil pump 28 and the left front wheel 14L is smaller than the speed reduction ratio between the second oil pump 58 and the right rear wheel 16R.

As described above, the torque loss caused by the first oil pump 28 is larger than the torque loss caused by the second oil pump 58. Accordingly, the speed reduction ratio between the first oil pump 28 and the left front wheel 14L is made smaller than the speed reduction ratio between the second oil pump 58 and the right rear wheel 16R. In this way, when the loss torques caused by the oil pumps 28, 58 are different from each other, the speed reduction ratios from the oil pumps 28, 58 to the wheels 14L, 16R can also be made different accordingly. Thereby, the degree of unbalance of the drive torque in the front wheels 14L, 14R and the degree of unbalance of the drive torque in the rear wheels 16L, 16R can be made to match or approximate each other. Therefore, the straightness of the electrified vehicle 10 is further improved.

What is claimed is:

1. An electrified vehicle comprising:
a first drive device disposed at a front portion of the electrified vehicle; and a second drive device disposed at a rear portion of the electrified vehicle, wherein:
the first drive device includes
a first motor connected to a left front wheel of the electrified vehicle via a first gear unit,
a second motor connected to a right front wheel of the electrified vehicle via a second gear unit, and
a first oil pump connected to the first gear unit or the second gear unit;
the second drive device includes
a third motor connected to a left rear wheel of the electrified vehicle via a third gear unit,
a fourth motor connected to a right rear wheel of the electrified vehicle via a fourth gear unit, and
a second oil pump connected to the third gear unit or the fourth gear unit;
one of the first oil pump and the second oil pump is connected to the first gear unit or the third gear unit; and
the other of the first oil pump and the second oil pump is connected to the second gear unit or the fourth gear unit.

2. The electrified vehicle according to claim 1, wherein a speed reduction ratio between the first oil pump and the left front wheel or the right front wheel is equal to a speed reduction ratio between the second oil pump and the right rear wheel or the left rear wheel.

3. The electrified vehicle according to claim 1, wherein:
the first oil pump is directly connected to the first motor or the second motor; and
the second oil pump is directly connected to the fourth motor or the third motor.

4. The electrified vehicle according to claim 1, wherein:
the first oil pump has a different size from the second oil pump; and
a speed reduction ratio between the first oil pump and the left front wheel or the right front wheel is different from a speed reduction ratio between the second oil pump and the right rear wheel or the left rear wheel.

5. The electrified vehicle according to claim 1, wherein the first gear unit, the second gear unit, the third gear unit, and the fourth gear unit have the same or laterally symmetrical structure.

* * * * *